Sept. 14, 1943.  A. H. NEULAND  2,329,480
ENGINE
Filed July 19, 1941  2 Sheets-Sheet 1

INVENTOR.
Alfons H. Neuland

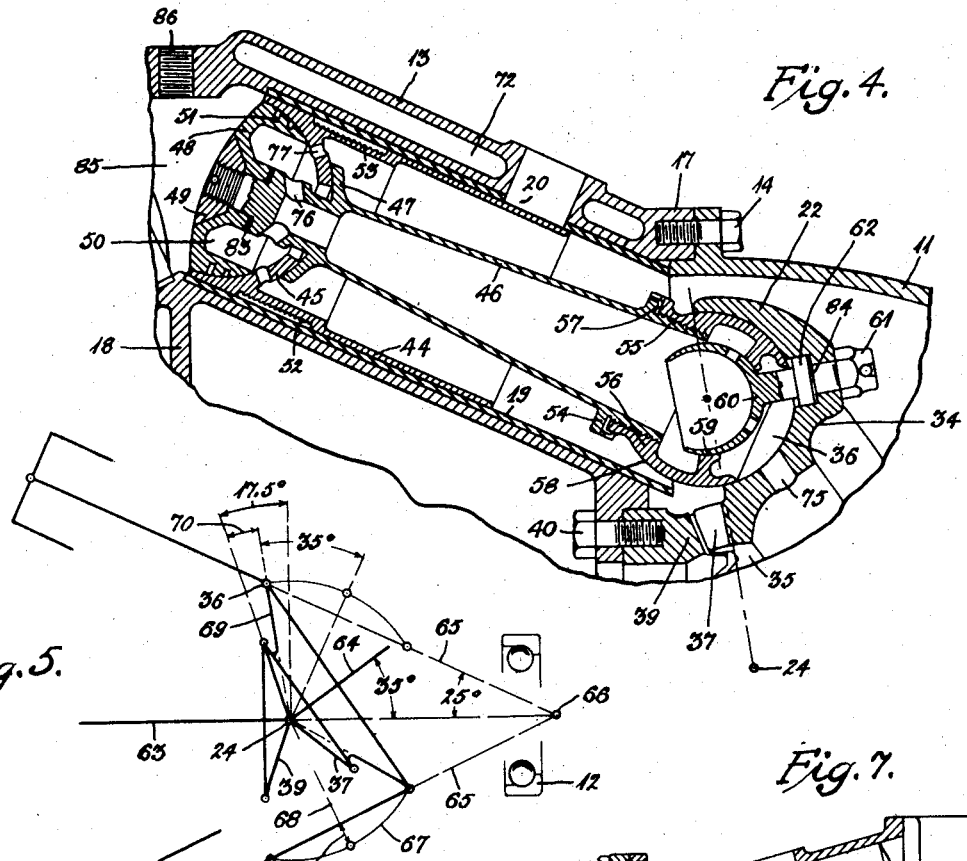
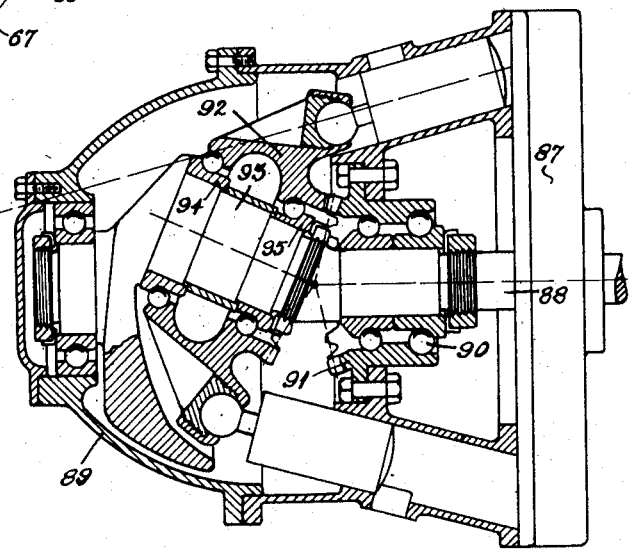
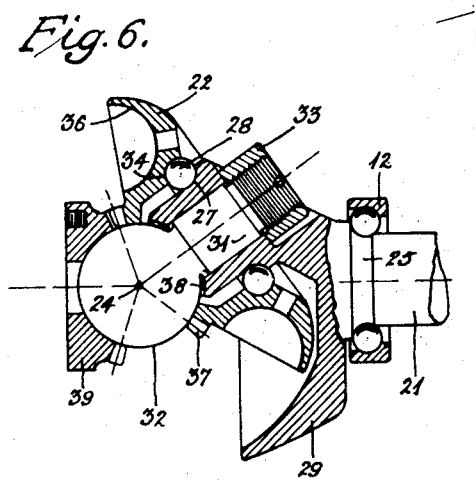

Patented Sept. 14, 1943

2,329,480

UNITED STATES PATENT OFFICE 2,329,480

ENGINE

Alfons H. Neuland, Cleveland, Ohio

Application July 19, 1941, Serial No. 403,190

18 Claims. (Cl. 123—53)

This invention pertains to engines and particularly to internal combustion engines of a class wherein laterally reciprocable pistons are connected to a rotatable power shaft by means of a non-rotatable wabbler.

The general object of the invention is to provide a compact internal combustion engine of light weight and simple construction capable of operating with high cylinder pressure and at high speed and to develop high power, and adapted for rapid production and assembly at low cost.

A particular object is to provide an improved transmission mechanism and improved cooperation between the pressure in laterally arranged cylinders and the power shaft. Another object is to provide an engine capable of operating at a relatively high but uniform temperature and to provide coordinated lubrication and cooling of pistons, cylinders and the transmission mechanism.

This application is in part a continuation of my copending application Serial No. 393,308, filed May 14, 1941.

My invention resides in novel features of construction and in the arrangement and combination of its component parts. The foregoing and other objects and advantages will appear in the following description and from the drawings showing several embodiments, and my invention will hereafter be more fully defined in the appended claims.

Fig. 4 is an enlarged sectional view of piston rod and piston, showing their construction and relation with associated parts.

Fig. 5 is a diagram showing the angular relationship between cylinders, shaft, bearing, wabbler and gears of the engine in Figure 1.

Fig. 6 is a view of a modification of the multi-portion crankshaft in Fig. 1.

Fig. 7 is a side elevation, partly in section of a modified embodiment of my invention.

Figure 1:
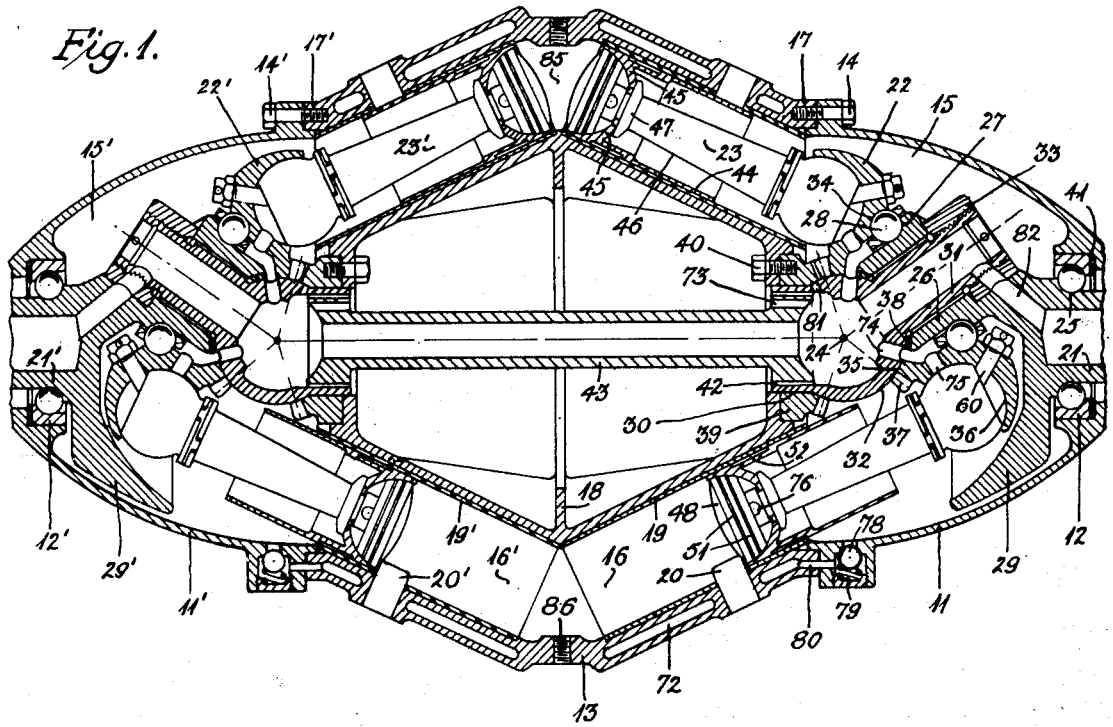
Fig. 1 is a vertical section of an engine embodying my invention taken on the line 8—8, in Figure 2.

The engine shown in Figures 1 to 5, consists of an engine body comprising a pair of thrust brackets 11, 11', provided with thrust bearings 12, 12', and secured to a cylinder block 13 by suitable means such as the bolts 14, 14', forming a pair of crank chambers 15, 15' at opposite ends of the engine body. The cylinder block is provided with pairs of associated cylinders 16, 16' extending laterally between the crank chambers. However I arrange the cylinders in an inclined position on axes converging toward the thrust bearings 12, 12', the pairs of associated cylinders forming elbows tied together at their ends by the annular portions 17, 17' of the block and preferably also at their apexes by the web 18. The cylinder block may be made of cast iron but is preferably made of a light metal, such as aluminum, and provided with wear resistant cylinder liners 19, 19', held in place by the brackets 11, 11', having induction and exhaust ports 20, 20', respectively for the passage of the working fluid through the cylinders. The inclined position of the cylinders directs the pressure thrust from the cylinders substantially in a straight line toward the bracket bearings which, with other features of construction and arrangements hereinafter described, permits the use of a high pressure in the cylinders without objectionable distortion of the cylinder block and brackets. The engine shown in Figures 1 to 5 has fourteen cylinders forming, in this instance, seven double cylinders, but it will be understood that any number of cylinders may be provided that will form an operative or practical engine.

I provide improved means for effectively transforming the high pressure developed in the cylinders into torsional power. This means comprises a pair of identical and laterally separable, rotatable power shafts 21, 21', operatively associated with the engine body; a pair of identical non-rotatable wabblers 22, 22' of unitary construction operatively associated with the power shafts and engine body; piston and rod assemblies 23, 23' for the cylinders articulatively connected with the wabblers, and improved fulcrum means associated with the wabblers and the engine body.

Each power shaft consists of separable major and minor portions shaped to form a one sided inclined crank element arranged within the crank chamber, having an axis intersecting the power shaft axis at the vertex 24. The major portion comprises a main bearing journal 25, supported by bearing 12 in bracket 11, a crank arm and an inclined internally splined annulus 26 extending inwardly from the crank arm, providing a thrust surface 27 at the outer end of the crank element which is preferably shaped and heat treated to form an integral bearing race for the rolling bodies 28. The major portion, at the diverging end of the crank element and diametrically opposite therefrom, is provided with a counterweight 29, which may be formed separately from the shaft and secured thereto in a suitable manner, but which is preferably formed integral with the shaft as shown in the figure. The minor portion comprises a main journal 30, operatively supported by the cylinder block and an externally splined inclined shank 31, fitted within the splined annulus 26 so as to align the axes of the main journals, and is formed to provide a thrust surface 32 at the inner end of the crank element. The major and minor portions are firmly locked together by a threaded extension of the shank 31 and the nut 33. The inclined crank element thus formed extends only from one side of the vertex point 24, is arranged wholly on one side of the power shaft and provides bearing surfaces 27 and 32, that are eccentric with respect to the main journals but are concentric with each other on an axis converging with the power shaft axis at the vertex point 24.

The wabblers 22, 22' are of unitary construction, each being formed to provide a thrust bearing surface 34 on one side operatively engaging the rolling bodies 28, and a thrust bearing surface 35 on the other side, preferably directly engaging the bearing surface 32 on the minor shaft portion. The outer portion of the wabbler is formed to provide concavities 36, one for each cylinder, and is further formed to provide integral bevel gear teeth 37 arranged concentric with and radially between the concavities and the bearing surface 35. It is seen that the concavities, bearing surfaces and gear teeth are all arranged in close proximity to one another and that the wabbler thus constructed has a moderate diameter and forms a light weight element of great strength and rigidity. The wabbler is preferably made from heat treated alloy steel to provide hardened bearing races directly in the body of the element and strong gear teeth. The wabbler is arranged entirely on one side of the vertex point 24 and is rigidly supported on the crank element by the rolling bodies 28 and the thrust surface 32 operatively engaging the wabbler bearing surfaces 34 and 35, and is held in an eccentric and inclined position on an axis converging with the power shaft axis at the vertex; and its working clearance may be adjusted and wear in the bearings may be compensated by merely inserting a washer 38 of proper thickness between the major and minor portions of the shaft.

I provide a bevel toothed gear 39 arranged concentric with and between the power shaft and the cylinders, secured to the cylinder block and in fixed relation with the engine body by suitable means such as the bolts 40. The gear 39, the wabbler and the surface of the minor shaft portion, between journal and shank, may preferably all be provided with spherical surfaces centered on the vertex 24, thus providing radial as well as lateral alignment not only between the minor shaft portion and the wabbler but also between it and the cylinder block, the desired working clearance between minor shaft portion and gear 39 again being attained simply by provision of a suitable washer 41 between thrust bearing 12 and bracket 11. The unitary construction of the wabbler, the separable construction of the power shaft and the arrangement of associated parts results in a compact and extremely rigid wabbler and shaft assembly of light weight and the effective use of anti-friction bearings. However it will be understood that the bearing surface 27 may be modified to accommodate a plain bearing in place of the rolling bodies 28, when desired, or in instances when extra low friction is desired, rolling bodies may also be provided between the minor shaft portion and the wabbler as well as the gear 39 in an obvious manner, not shown. The compactness and light weight of the wabbler and shaft assembly has other advantages. For instance it enables me to use crank chambers of moderate diameter and brackets of light weight and of a form well suited for transmitting the powerful thrust between cylinder block and thrust bearings 12, 12' without objectionable distortion, and necessitates the use of only moderate counterweights which can readily be housed in crank chambers of small diameter.

Figure 2:
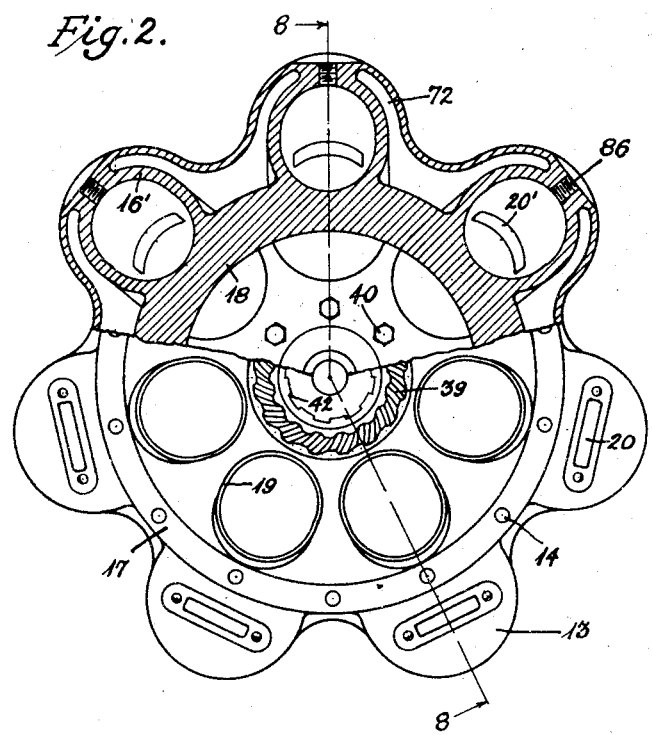
Fig. 2 is partly an end elevation of the cylinder block with the end bracket and crankshaft assembly removed, and is partly a transverse section taken through the center of the cylinder block.
Figure 3:
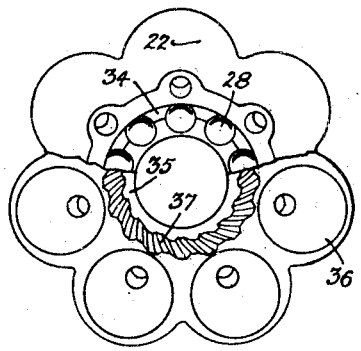
Fig. 3 is an elevation of the wabbler, the upper portion showing its outerly side and the lower portion its innerly side.

The bevel gear 39 and the bevel gear formed by gear teeth 37 on the wabbler face are provided with identical pitch diameters and pitch cones and are positioned and arranged to mesh with each other so that their pitch cone centers align with the vertex 24. In this connection it should be noted that while the bearing surfaces 32, 35 and the bearing surface within the gear 39 need not necessarily be spherical, the provision of such spherical surfaces greatly facilitates alignment, as it fixes the vertex point of the inclined crank element and power shaft axes and insures the alignment of the pitch cone centers of the gears at the vertex by the simple expedient of the washer 41 providing a proper working clearance. My construction and arrangement provides a simple and compact and inherently powerful and quietly operating fulcrum of light weight, and make the use of any standard tooth form practicable. However I prefer to provide fulcrum gears with spiral bevel teeth as shown in Figures 2 and 3 in order to secure a quietly operating fulcrum of high torque ability. The power shaft portions, the wabbler and gear 39, may all be heat treated to provide strong gear teeth as well as wear resistant bearing surfaces.

The power shafts 21, 21' are rotationally connected to operate as a unit in fixed circumferential relationship with one another. This is accomplished by an axially slidable joint 42 such as splines cut in the ends of the minor power shaft portions. The shafts may be formed to mesh with each other but are preferably formed to mesh with splines in an intermediate shaft 43 arranged to join the power shafts as shown in Fig. 1. Since the shaft 43 is formed separately from and is not called upon to provide rigid support for, the power shafts, it is constructed from light weight tubing and contributes towards reduction of the engine weight. Furthermore any small misalignment between major and minor portions of one power shaft is not transmitted to the other and because of its local character any such small misalignment does not affect the operation, since each power shaft floats separately between its bracket bearing 12 and gear bearing 39. The shaft 34 floats in the splined joint 42 and is free to expand or contract laterally without disturbing the alignment of the elements with the vertex 24. The inclined crank of one power shaft is angularly displaced with respect to the other so that the exhaust ports open before the induction ports and the degree of such lead is readily secured, or it may be changed, by the splined joint between shafts.

In engines using but a single shaft, the multi portion shaft may be made inherently self aligning, provided power is taken off at the major end of the shaft. This is accomplished by shaping the minor portion to form a sphere operatively engaging a spherical concavity, formed in the gear 39, concentric with the gear pitch cone center or vertex, 24 as shown in Fig. 6, and in such instances the splines in the annulus 26 and in the shank 31 may be omitted. The shaft portions may be locked together by a threaded extension of the shank and a nut, as in Fig. 1, or, in any installation, may be locked together in any other manner that will form a strong and rigid shaft and wabbler assembly.

The construction of the piston and rod assemblies whereby I secure effective transmission of pressure thrust in the cylinders to the wabblers will now be described with particular reference to the enlarged view of Fig. 4. Each assembly consists of a piston or sleeve 44 having an inwardly extending rim or flange 45 provided, on the side facing the combustion chamber, with a concavely spherical bearing surface which will be referred to as a concave, and on the other side provided with a convexly spherical bearing surface, formed concentric with the concave, which will hereafter also be referred to as a convex. One end of the piston rod 46 extends through the flange 45 and is provided with a bearing collar or shoulder 47, which may be formed separately from, but is preferably formed integral with, the rod 46 and is provided with a substantial spherical bearing surface arranged to bear against the convex in flange 45. The protruding end of the piston rod is provided with an expanded end portion 48, preferably formed separately and secured to the end of the rod by suitable means, such as the locknut 49, and forms a piston rod head. One side of the head 48 is exposed to the interior of the cylinder and the other side is provided with a spherical surface in operative bearing engagement with the piston flange concave and is shaped to form therewith a cooling or lubricating chamber 50 having a substantial surface in close heat conducting proximity to the exposed side of the head. Thus the bulk of the high pressure developed in the cylinder is made to thrust directly against the head of the piston rod and since only a narrow edge of piston sleeve 44 is exposed to the interior of the cylinder the thrust on the piston sleeve 44 and on the shoulder 47 is relatively small. Although the diameter of the piston rod head is nearly that of the cylinder bore, its movement or weaving with respect to the flange 45, is inconsiderable, for reasons which will hereafter be more fully described. Expansible sealing rings 51 between sleeve 44 and head 48, and an expansible sealing ring 52 between sleeve 44 and the cylinder bore are provided. The width of sealing ring 52 is preferably made to exceed the width of the port 28, insuring free passage of the ring over ports having substantial angularly extending openings. The ring 52 on its inner side is provided with a plurality of grooves 53 which are preferably tapered and may be formed separate from one another or may be cut in the ring like an internal single or multiple thread, the grooves in the piston sleeve 44 being shaped to match, so as to form a tongue and groove like multiple seal. During operation, gas pressure against the side of the ring forces the tongues in the ring 52 against the grooves in sleeve 44 and thereby prevents compressed gas from working under the ring and excessively pressing the ring against the cylinder wall. The concentric shape of the piston sleeve 44 permits it to be machined all over and to be formed with very thin walls. The construction lends itself to the production of light weight pistons made from a strong metal having the same heat expansion characteristics as the cylinders, such as iron or steel, and permits fitting the pistons in the cylinders with a small working clearance without risk of seizure. The broad idea dealing with a construction and arrangement for transferring the major portion of thrust, developed by pressure in a cylinder directly to the piston rod, is claimed in my copending application Serial No. 382,685, filed on March 11, 1941.

The piston rod 46, beyond the outer side of shoulder 47 is preferably shaped to form a thin walled taper tube and near the end is provided with a notched shoulder 54 and with an externally threaded portion 55 extending beyond the shoulder upon which a separately formed hollow head 56 is screwed and locked in place by a pronged lock washer 57 engaging the notches in the shoulders. The head 56, on its outer side, forms a spherical bearing surface 58 matching the concavity 36, and on its inner side is provided with a concavely spherical bearing surface 59 concentric with the bearing 58. Within the hollow head and operatively engaging the bearing 59 I provide a retaining bearing element 60, secured to the wabbler 22 by means of a nut 61, which forces the collar 62 firmly against a seat provided in the wabbler. In assembling, the retaining element 60 is inserted into the hollow head through the threaded end before the rod is screwed into the head. The close proximity of the end of rod 23 to the retaining bearing 60, serves to hold the bearing in position and facilitates its assembly with the wabbler. This means for connecting the piston rod with the wabbler provides not only a large thrust bearing surface but permits articulation of the rod with respect to the wabbler over a wide angle, and makes it possible to incline the crank element at a steep angle and thus secure a long piston stroke with a small, rigid and compact wabbler and crank assembly, and since this construction permits the center of the concavities in the wabbler to be brought close to the ends of the cylinders, the length of the piston rods is reduced. The piston and rod assembly thus formed is rigid and strong and well adapted to transmit a powerful thrust. The rod 23, its heads and the piston sleeve may be formed with very thin walls providing reciprocating assemblies of light weight which help to reduce the engine weight and contribute to the smooth operation of the engine at high speed. This construction and arrangement of cylinder block, power shaft, wabbler and associated parts forms a transmission mechanism that is light in weight, yet very powerful. During the period of highest cylinder compression as in the upper half of Fig. 1, the thrust, developed by the pressure in the cylinder, is transferred to the bearing 12 through the solid portion of the power shaft in a straight line. Direction of the thrust toward and its concentration from the cylinders upon the bearing 12 prevents distortion of the power shaft and substantially relieves the load upon the bearing surface 32 of the minor shaft portion. This characteristic of my construction and arrangement contributes toward the provision of a simple and compact shaft and wabbler assembly since the bearings engaging the surface 32 serve substantially only as pilot bearings and need be proportioned to carry only a moderate load. The arrangement also prevents distortion of the wabbler during periods of highest cylinder compression, since, at this time, the rolling bodies 28 are directly interposed between the wabbler and power shaft. It will be noted that the perpendicular axis of the rolling bodies 28 is inclined with respect to the line of thrust between the upper cylinder and bearing 12, so that the bearing on the crank element, formed by the bodies 28, operates in the manner of an angular contact bearing and is adapted to carry heavy loads, particularly since the load upon it is substantially uniform during the entire revolution of the shaft. While in the illustration the bodies 28 are spherical in shape it will be understood that rolling bodies of other shapes may be used, for instance, they may have a taper or oval shape.

The long stroke, opposed piston arrangement and the powerful transmission mechanism permit the effective use of high compression and combustion pressures and operation of the engine with compression ignition. Furthermore construction of the cylinder block with inclined cylinders enables me to secure a combustion chamber of favorable shape well suited for injection of liquid fuel, or for spark ignition when supplied with a suitable gas mixture. Referring to the upper half of Fig. 1, it is seen that the inclined heads 48, 48' form a wedge shaped combustion chamber 85, having a large volume-surface ratio and that the opening 86, adapted to accommodate a fuel injector or spark plug, is positioned in the base portion of the wedge, providing a short radius for the fuel spray or favorable conditions for flame propagation, respectively.

The inclination of the various elements of the engine shown in Fig. 1, and the angular relationship of their axes may best be understood by reference to Fig. 5. In the figure, the vertex point or intersection of the power shaft axis 63 with axis 64 of the crank and wabbler is indicated at 24 and the pitch cone of the gear 39 has an inclined angle of 17.5° from the perpendicular with the power shaft axis 63. In order to secure fulcrum gears with identical diameters and pitch cones, I incline the crank element axis 64, away from alignment with axis 63, twice the above angle, that is 35°, and arrange gears 37 and 39 between the cylinders and the power shaft as heretofore already described. The cylinder axes 65 incline at an angle of 25° and converge toward the bearing 12 and intersect the axis 63 at the point 66, and the concavities 36 in the wabbler are positioned so that their center reciprocates along the arc 67, preferably an equal distance on both sides of the perpendicular 68 to the cylinder axis 65. The concavity centers 36 are preferably also positioned at a distance from the vertex 24, so as not to cross inwardly of the cylinder axis 65. Such positioning eliminates piston slap, keeps the piston sleeve in contact with the innerly portion of the cylinder wall and prevents the end of the piston sleeve from rubbing against the edge of port 20, especially when the ports extend over a considerable portion of the cylinder periphery. Furthermore I preferably provide an angular relationship between the various axes in which the cone 69, formed by the concavity centers 36 with the vertex 24, has a sharper angle than the angle formed by the gear pitch cone 37. This difference is indicated at 70 in Fig. 5 and permits formation of the unitary wabbler so that the teeth protrude beyond the wabbler face making it possible to machine the gear teeth integral with the wabbler body with a rotary cutter in an efficient manner. It will be noted that the concavity center 36 moves with respect to the cylinder axis 65 substantially only the distance indicated at 71, and is accompanied by merely a slight movement of the head 48 with respect to the piston flange 45. While the angle relationship shown in Fig. 5 represents a favorable arrangement it will be understood that other relationships may be employed depending on the characteristics which it is desired to secure.

I also provide lubrication for the bearings, gears and other parts and coordinated cooling of pistons, cylinders and the transmission mechanism with but a single liquid, serving as a lubricant and coolant. Coordinated lubrication and cooling is facilitated by the hollow construction of the elements and is accomplished by provision, in the cylinder jacket 72, of a lubricant, such as oil, to serve as the cooling liquid for the cylinders and the provision of means for circulating the oil between jacket and pistons and between the crank chambers and jacket. In the engine shown in Figs. 1 to 4, oil from the jacket 72 enters the minor power shaft portion through the duct 73 and reaches the hollow piston rod 46 through the ducts 74 and through the duct 75 in the wabbler, which is uncovered by the head 56 only when the piston is on inward position. At this time the liquid in the hollow rod is thrown toward the piston and develops a vacuum at the duct 75, that draws liquid into the rod and at the same time develops a pressure at the piston ends that expels the liquid from the rod through the duct 76 into chamber 50 and out of the chamber through the duct 77, the liquid accumulating at the bottom of the crank chamber. The oil from the crank chambers is returned to the jacket 72 by means of a mild pressure that builds up in the chambers as a result of blow-by of compressed gas past the pistons. This pressure, acting on the bell check 78 provided at the bottom of each bracket, overcomes the tension of spring 79 and through the duct 80 forces the oil back into the jacket 72, the check valve serving to prevent oil in the jacket from entering the crank case when the engine is not in operation. Oil also enters the duct 81 and lubricates the bearing in gear 39, the surplus escaping along the surfaces of the gear teeth and serving to lubricate them. This feature provides positive lubrication for all bearing surfaces and also maintains a uniform temperature in operatively associated parts and thus makes it possible to provide a close working clearance between cylinders and piston sleeves and between other operatively associated parts and to operate the engine at a higher and more efficient temperature without risk of seizure.

When a non-lubricating liquid is used for cooling the cylinders, lubrication may be secured simply by omitting the ducts 73 and 80 and supplying oil through the end of the shaft in the conventional manner by means of a duct 82.

With my construction and arrangement, assembly and disassembly of the engine can be quickly and easily effected; for instance, removal of the bolts 14 permits withdrawal of bracket 11 and the power shaft and wabbler assembly, and the rods and pistons may be withdrawn along with the wabbler or separately by merely removing the nuts 61. Wear in the bearings of the shaft and wabbler assembly is quickly and easily compensated by the simple expedient of the washers 38 and 41 as heretofore already set forth, and wear in the bearings of the piston sleeve, rod and concavities of the wabbler is just as readily taken up by the washers 83 and 84, and as a result parts may be replaced and the engine may be overhauled by the exercise of ordinary mechanical skill, a feature much to be desired in an emergency.

While my invention is particularly adapted to form a complete engine in which the pistons also operate as valves for the working fluid, it should be understood that one or more of the features herein disclosed may be modified or combined to form other embodiments. For example in Fig. 7, I have shown how some of the features of my invention may be applied to form an engine provided with a valve head 87 and in which the power shaft 88 is formed integral with the crank element and the thrust is taken, not by the bracket 89, but by a bearing 90 arranged within the fulcrum gear 91. The wabbler 92 is mounted upon the crank element 93 by means of the bearings 94 and 95, proportioned so that they may be slipped over the small end of shaft for assembling upon the crank element. However this embodiment lacks many of the advantages of the engine shown in Fig. 1, for instance, the wabbler and power shaft assembly does not have the same compactness and light weight nor has it the same simplicity.

Various changes may be made in the details of construction and combination of the various parts of my device without departing from the spirit of my invention, and I desire to cover by my claims changes and embodiments which may reasonably be included within the scope of my invention.

I claim as my invention:

1. In an engine of the class wherein an engine body is operatively associated with a shaft and an oscillable wabbler is operatively supported by the shaft on an axis intersecting the axis of the shaft in a plane substantially at the vertex and is adapted to impart movement to laterally reciprocable pistons arranged about the shaft and is associated in operative fulcrum relation with said engine body: the combination with said engine body of laterally extending cylinders for said pistons arranged to incline substantially with respect to the axis of the power shaft inwardly towards said wabbler and means including joints associated with the wabbler connecting the wabbler with said pistons, each wabbler joint being positioned so that its center forms with said vertex an axis inclining substantially from the perpendicular with the wabbler axis in a direction away from said cylinders.

2. In an engine of the class wherein a non-rotating wabbler is operatively supported by a rotatable power shaft on an inclined axis intersecting the axis of the power shaft in a plane substantially at the vertex and is adapted to impart movement to laterally reciprocable pistons: the combustion with said power shaft of an engine body provided with laterally extending cylinders for said pistons, the cylinders being arranged to incline substantially with respect to the rotational axis of the power shaft, and means including joints associated with said wabbler connecting the wabbler with said pistons, the wabbler joints being positioned so that their centers when in the midway position of their lateral movement form axes with said vertex which incline substantially away from the cylinders and from the perpendicular with respect to the rotational axis of the power shaft.

3. In an engine of the class wherein a non-rotating wabbler is operatively supported by a rotatable power shaft on an inclined axis intersecting the axis of the power shaft in a plane substantially at the vertex and is adapted to impart movement to laterally reciprocable pistons and is provided with a bevel gear operatively engaging a bevel gear fixedly associated with a stationary engine body: the combination with said engine body of laterally extending cylinders for said pistons arranged to incline substantially with respect to the rotational axis of the power shaft inwardly towards said wabbler and means including joints associated with the wabbler connecting the wabbler with said pistons, each wabbler joint being positioned to form with said vertex an axis inclining substantially from the perpendicular with the wabbler axis in a direction away from said cylinders and beyond the dedendium angle of said wabbler bevel gear.

4. In an engine of the class wherein a rotatable power shaft is provided with an inclined crank element having an axis intersecting the axis of the power shaft substantially at the vertex and a piston rod is connected with a laterally reciprocable piston: the combination with said power shaft, piston rod and piston of an engine body operatively supporting the power shaft and provided with a laterally extending cylinder for said piston having its axis arranged substantially in a plane with but substantially inclined with respect to the rotational axis of said power shaft and further arranged so that the open end of the cylinder inclines inwardly toward said crank element; and a wabbler in operative association with the crank element and engine body provided with a spherical joint connecting the wabbler with the piston rod, the joint in said wabbler being positioned so that its center, when in the midway position of its lateral movement, and said vertex form an axis inclining away from the cylinder at its outer end and substantially away from the perpendicular with the axis of the crank element.

5. In an engine of the class wherein laterally reciprocable pistons are adapted to be operatively connected with an inclined crank element of a rotatable power shaft: the combination with said power shaft of an engine body provided with inclined cylinders for said pistons arranged to converge inwardly towards said crank element and a wabbler operatively associated with the engine body and said crank element shaped to form on the side facing the cylinders a substantially conical face having substantially semi-spherical concavities arranged therein and means extending from said concavities connecting the wabbler with said pistons.

6. In an engine of the class wherein a rotatable power shaft is provided with an inclined crank element and with rolling bodies arranged about the crank element on an axis intersecting the power shaft axis substantially at the vertex, an engine body provided with laterally extending cylinders operatively supports the power shaft, reciprocable pistons in the cylinders are provided with piston rods extending laterally out of the cylinders and a bevel gear is arranged concentric with and between the power shaft and said piston rods: the combination with said crank element of a unitary wabbler shaped to form on the side facing the cylinders a substantially conical face having substantially semi-spherical concavities arranged therein connecting the wabbler with said piston rods and shaped to form bevel gear teeth extending beyond said conical face meshing with said bevel gear and on its other side shaped to provide a bearing surface in operative engagement with said rolling bodies.

7. In an engine of the class wherein a rotatable power shaft is provided with a crank arm and an inclined crank element extending from said crank arm and laterally reciprocable pistons are arranged about said shaft: the combination with said power shaft of a cup shaped counterweight arranged opposite and in fixed relation with said crank element providing a hollow space between the crank element and the inner surface of said counterweight; a non-rotating wabbler operatively associated with the crank element and arranged partly within said hollow space; an engine body operatively supporting the power shaft and provided with cylinders for said pistons arranged to substantially incline inwardly toward said hollow space, and piston rods connecting the wabbler with said pistons arranged to extend into said hollow space between the counterweight and said crank element as the shaft rotates.

8. In an engine of the class wherein laterally reciprocable pistons having piston rods adapted to be connected with a wabbler operatively associated with an inclined crank element of a rotatable power shaft, and an engine body operatively supports the power shaft: the combination with said engine body of laterally extending cylinders for said pistons arranged to incline inwardly toward the crank element, said engine body forming a bell shaped crank case for said wabbler extending laterally from said cylinders; a cup shaped counterweight fixedly associated with the power shaft and arranged within said bell shaped crank case so as to envelop a circumferential portion of said wabbler; and joints connecting the piston rods with the wabbler, said joints being arranged to extend into the hollow space of the cupped portion of said counterweight as the power shaft rotates.

9. In an engine of the class wherein a shaft is provided with an inclined crank element, a relatively movable wabbler is operatively supported on said crank element and provided with a spherical concavity positioned to laterally reciprocate with respect to said shaft, an engine body forms a crank chamber and a laterally extending cylinder, and a piston rod connected with a piston within said cylinder extends into said crank chamber: the combination with the free end of said piston rod of a hollow head portion fixedly secured to said rod and provided with an outer convexly spherical bearing surface in operative association with the spherical concavity of the wabbler and further provided with an inner concavely spherical bearing surface formed spherically concentric with said outer spherical bearing surface, and a retaining element arranged within said hollow head in fixed relation with the wabbler and provided with a convexly spherical bearing surface operatively engaging the concavely spherical bearing surface within said head.

10. In an engine of the class wherein a shaft is provided with an inclined crank element, a relatively movable wabbler is operatively supported on said crank element and provided with spherical concavities positioned to laterally reciprocate with respect to said shaft, an engine body forms a crank chamber for said wabbler and laterally extending cylinders opening into said crank chamber are subjected to pressure: the combination with said wabbler and cylinders of means for transferring thrust between said cylinders and wabbler comprising a relatively movable piston sleeve in each cylinder having an inwardly extending flange provided on one and the other side thereof with concave and convex respectively concentric with one another bearing surfaces, a piston rod for each piston sleeve provided on one of its ends with a head having one side substantially exposed to the interior of the cylinder and having the other side operatively associated with the concave bearing surface of the piston flange and provided on the other end with a hollow head operatively associated with a concavity in said wabbler, a retaining element arranged within said hollow head in fixed relation with, and concentric with the concavity in said wabbler, and means associated with said rod in operative relation with the convex bearing surface of said piston flange for maintaining operative relation between the rod and said piston sleeve.

11. In an engine of the class wherein a rotatable power shaft is operatively associated with a non-rotatable wabbler and an engine body operatively supports the power shaft and is provided with a laterally extending cylinder: the combination with said wabbler and engine body of a reciprocable piston sleeve in said cylinder having an inwardly extending flange provided on one and the other side thereof with concave and convex bearing surfaces arranged concentric with one another, a rod having one end portion operatively connected with the wabbler and having the other end portion provided with a shoulder bearing against said convex surface, and a head secured to the end of the rod beyond the shoulder having one side substantially exposed to the interior of the cylinder and having the other side operatively associated with said concave surface.

12. In an engine of the class wherein an engine body forms a crank chamber and is provided with laterally arranged cylinders extending from the crank chamber and reciprocable pistons in the cylinders: the combination with said pistons and engine body of a wabbler within the crank chamber operatively connected with the pistons and engine body and provided with radial and thrust bearing surfaces on opposite sides thereof, and a rotatable multi-portion separable power shaft comprising a major portion and a minor portion operatively supported by the engine body, the major portion being shaped to form a one sided inclined crank element having an axis intersecting the power shaft axis substantially at the vertex and operatively supporting the wabbler substantially on one side of the vertex in an inclined and eccentric position, said shaft portions having means engaging said thrust surfaces and being provided with means for locking the separable portions firmly together and a counterweight fixedly associated with said major portion, arranged opposite the crank element and shaped to form a cup partly surrounding said wabbler.

13. In an engine of the class wherein an engine body, comprising a cylinder block and bearing bracket secured thereto, provides a crank chamber and cylinders extending laterally from the crank chamber and pistons in the cylinders are connected with piston rods extending laterally into the crank chamber: the combination with said engine body and piston rods of a rotatable multi-portion power shaft shaped to form a one sided inclined crank element arranged within the crank chamber having an axis intersecting the power shaft axis substantially at the vertex, the shaft comprising a major portion having a main journal operatively supported by the bracket, a crank arm and an inclined internally splined annulus extending inwardly from the crank arm providing a thrust surface at the outer end of the crank element, and comprising a minor portion having a main journal operatively supported by the cylinder block and having an externally splined inclined shank fitted within said annulus for aligning the axes of the main journals and having a shoulder providing a thrust surface at the inner end of the crank element, and further comprising means for locking the major and minor shaft portions firmly together; and a wabbler operatively connected with the piston rods and engine body and operatively supported between the thrust surfaces of the crank element substantially on one side of the vertex in an eccentric and inclined position with respect to the axis of the power shaft.

14. In an engine of the class wherein an engine body, comprising a cylinder block and bearing bracket secured thereto, provides a crank chamber and cylinders extending laterally from the crank chamber and pistons in the cylinders are connected with piston rods extending laterally into the crank chamber: the combination with said engine body and piston rods of a rotatable multi-portion power shaft shaped to form a one sided inclined crank element having an axis intersecting the power shaft axis substantially at the vertex and positioned within the crank chamber, the shaft comprising a major portion having a main journal operatively supported by the bracket, a crank arm and an inclined shank extending inwardly from the crank arm providing a thrust surface at the outer end of the crank element, and comprising a minor portion shaped to form a spherical surface operatively supported by the cylinder block and providing a thrust surface at the inner end of the crank element and further comprising means for locking the major and minor shaft portions firmly together; and a wabbler operatively connected with the piston rods and engine body and operatively supported between the thrust surfaces of the crank element substantially on one side of the vertex in an eccentric and inclined position with respect to the axis of the power shaft.

15. In an engine of the class wherein a pair of axially spaced non-rotatable wabblers are connected with oppositely arranged laterally reciprocable pistons: the combination with said wabblers and pistons of a pair of thrust brackets and a pair of rotatable axially aligned power shafts provided with a crank element fixedly associated therewith and each shaft being associated with a wabbler and with a bracket and being provided with thrust bearing means for transferring thrust between a shaft and a corresponding bracket; a cylinder block secured to said brackets forming therewith a pair of crank chambers for said wabblers and provided with substantially inclined cylinders for said pistons arranged on axes converging substantially toward the bracket thrust bearings and forming elbows extending laterally between crank chambers; and means for rotationally connecting the inner ends of said power shafts to operate as a unit including a laterally slidable connection associated with the inwardly facing ends of said power shafts.

16. In an engine of the class wherein a pair of axially spaced wabblers are arranged to face opposite sides of a cylinder block provided with cylinders extending laterally through the block and with opposed reciprocable pistons in the cylinders provided with means for transferring the piston thrust to the wabblers: the combination with said cylinder block and wabblers of a pair of thrust brackets secured to the ends of the cylinder block, each bracket provided with a thrust bearing; a separate rotatable power shaft for each end of the block, each shaft having a crank element fixedly associated therewith and being associated with a corresponding wabbler and thrust bearing and provided with means for transmitting thrust therebetween; and means for rotationally connecting the power shafts including a laterally slidable connection associated with the inwardly facing ends of said shafts.

17. In an engine: an engine body comprising a thrust bracket provided with a thrust bearing and a cylinder block secured to the bracket forming therewith a crank chamber and provided with laterally extending inclined cylinders arranged to have their axes converge substantially toward said thrust bearing; an assembled multi-portion rotatable power shaft engaging said thrust bearing and shaped to form a one sided inclined crank element provided with a pair of oppositely arranged separable thrust bearing surfaces having concentric axes intersecting the power shaft axis substantially at the vertex and provided at its diverging end with an oppositely positioned counterweight; a bevel gear fixedly associated with the cylinder block and arranged concentric with the power shaft between the cylinders and the shaft and having its pitch cone center substantially aligned with the vertex; a wabbler on said crank element provided on opposite sides with bearing means engaging said thrust bearing surfaces, and provided with integrally formed bevel gear teeth meshing with, and having the same pitch diameter and pitch cone as, and their pitch cone center substantially aligned with that of said first mentioned gear, and further provided with a spherical bearing concavity for each cylinder, and concentric with each concavity provided with a retaining bearing element; and thrust transmitting means comprising a reciprocable piston sleeve in each cylinder having an inwardly extending flange provided on one and the other side thereof with concave and convex respectively concentric bearing surfaces, a rod having one end portion provided with a shoulder bearing against said convex and a head removably secured to the rod beyond the shoulder having one side substantially exposed to the interior of the cylinder and having the other side operatively associated with said concave, and a hollow second head removably secured to the other end portion of the rod provided with external and internal convex and concave respectively spherically concentric bearing surfaces operatively engaging said spherical concavity and retaining bearing of the wabbler.

18. In an engine: an engine body comprising a pair of laterally spaced thrust brackets, each provided with a thrust bearing and a cylinder block secured to the brackets forming therewith a pair of crank chambers and provided with inclined cylinders arranged on axes converging substantially toward the thrust bearings and forming elbows extending laterally between crank chambers; a pair of assembled multi-portion rotatable and axially aligned power shafts in the crank chambers engaging the thrust bearings, each shaft forming a one sided inclined crank element provided with a pair of oppositely arranged separable thrust bearing surfaces having concentric axes intersecting the power shaft axis substantially at the vertex and provided at its diverging end with an oppositely positioned counterweight; a pair of bevel gears fixedly associated with the cylinder block and arranged concentric with the power shaft between the cylinders and shaft, each having its pitch cone center substantially aligned with a corresponding vertex; a pair of wabblers in said crank chambers, each associated with a crank element and provided on opposite sides with bearing means engaging said thrust bearing surfaces and provided with integrally formed bevel gear teeth meshing with and having the same pitch diameter and pitch cone as, and their pitch cone center substantially aligned with that of said first mentioned gear, and further provided with a spherical bearing concavity for each cylinder, and concentric with each concavity provided with a retaining bearing element; thrust transmitting means between the interior of the cylinders and the wabblers, each means comprising a reciprocable piston sleeve in the cylinder having an inwardly extending flange provided on one and the other side thereof with concave and convex respectively bearing surfaces, a rod having one end portion provided with a shoulder bearing against said convex and a head removably secured to the rod beyond the shoulder having one side substantially exposed to the interior of the cylinder and having the other side operatively associated with said concave, and a hollow second head removably secured to the other end portion of the rod provided with external and internal convex and concave respectively spherically concentric bearing surfaces operatively engaging a spherical concavity and retaining bearing of an associated wabbler; and means for rotationally connecting said power shafts including a laterally slidable joint.

ALFONS H. NEULAND.